United States Patent
Breault et al.

[11] Patent Number: 6,050,331
[45] Date of Patent: *Apr. 18, 2000

[54] COOLANT PLATE ASSEMBLY FOR A FUEL CELL STACK

[75] Inventors: Richard D. Breault, Coventry, Conn.;
Ronald G. Martin, Monson, Mass.;
Robert P. Roche, Cheshire, Conn.;
Glen W. Scheffler, Tolland, Conn.;
Joseph J. O'Brien, Marlborough, Conn.

[73] Assignee: International Fuel Cells L.L.C., South Windsor, Conn.

[*] Notice: Under 35 U.S.C. 154(b), the term of this patent shall be extended for 493 days.

[21] Appl. No.: 08/626,015

[22] Filed: Mar. 22, 1996

Related U.S. Application Data

[63] Continuation of application No. 08/246,581, May 20, 1994, abandoned.

[51] Int. Cl.[7] ............................................. F28F 3/12
[52] U.S. Cl. .................... 165/168; 165/171; 165/905; 428/299.1; 428/407
[58] Field of Search .................... 165/168, 170, 165/171, 185, 905; 428/299.1, 407

[56] References Cited

U.S. PATENT DOCUMENTS

| | | |
|---|---|---|
| 3,498,371 | 3/1970 | Zygiel .............................. 165/168 X |
| 3,801,374 | 4/1974 | Dews et al. . |
| 4,152,482 | 5/1979 | Reynolds et al. ........................ 428/284 |
| 4,355,684 | 10/1982 | Caines .................. 165/164 X |
| 4,471,837 | 9/1984 | Larson .................................... 165/185 |
| 4,583,583 | 4/1986 | Wittel .................. 165/170 X |
| 4,852,645 | 8/1989 | Coulon et al. .......................... 165/185 |
| 4,946,892 | 8/1990 | Chung ...................................... 524/847 |
| 4,987,175 | 1/1991 | Bunnel, Sr. ............................. 524/449 |
| 5,283,219 | 2/1994 | Mauran et al. ..................... 165/905 X |
| 5,285,845 | 2/1994 | Ostbo ...................................... 165/168 |

Primary Examiner—Leonard Leo
Attorney, Agent, or Firm—William W. Jones

[57] ABSTRACT

The coolant plate component of a fuel cell assembly is formed from a plate made from graphite particles that are bonded together by a fluorocarbon polymer binder and which encapsulate a serpentine coolant circulation tube. The coolant plate component is non-porous. The graphite particles are preferably flakes which pack together very tightly, and require only a minor amount of the polymer binder to form a solid plate. The plate will provide enhanced heat transfer, will conduct electrons, and will block electrolyte migration from cell to cell in a fuel cell stack due to its construction. The composition of the plate is graded so as to provide a varied coefficient of thermal expansion as measured through the thickness of the plate so as to reduce thermal stresses imposed on the fuel cell stack. The coolant circulation tube has a roughened outer surface which enhances adhesion of the encapsulating graphite flake/binder mixture without inhibiting heat transfer.

12 Claims, 1 Drawing Sheet

COOLANT PLATE ASSEMBLY FOR A FUEL CELL STACK

This is a continuation of U.S. Ser. No. 08/246,581 filed May 20, 1994, now abandoned.

TECHNICAL FIELD

This invention relates to a coolant plate for use in a fuel cell assembly, and more particularly to a coolant plate that possesses enhanced heat transfer characteristics, is non-porous and is resistant to thermally-induced stresses.

BACKGROUND ART

Coolant plate structures for fuel cell stack assemblies typically include a metal serpentine coolant flow tube which is embedded in a conductive plate formed from a carbon/binder mixture. The conductive plates have been formed from carbon particles which are essentially spheroidal in configuration; and the binder is a fluorocarbon resin which is hydrophobic, and which imparts hydrophobic characteristics to the coolant plate. The plates are homogeneous mixtures of carbon and binder in the through plane.

Problems have arisen in connection with the prior art coolant plates, which problems relate generally to the stability of the plates and their ability to transfer heat to the coolant tubes under stack operating conditions. The use of spheroidal carbon particles as the conductive component of the coolant plates has resulted in the need for relatively high percentages of hydrophobic resin binder in order to form a cohesive component which will endure under stack operating conditions. The high binder content results in a coefficient of thermal expansion (CTE) for the composite plate which is sufficiently different from the CTE of other stack components that thermal stress will occur when the stack is operated.

Another problem that resides in the prior art coolant plate assemblies relates to the ability of the carbon particle-binder mixture to adhere to the serpentine metal coolant tube. In order to provide for good heat transfer from the plate to the coolant, a durable intimate bond is desired between the carbon particles and the metal tube. Such a bond has not, however, been consistently produced by the carbon particle-hydrophobic binder system used in the prior art. One solution to the bond problem has been to coat the metal coolant tube with a resin layer so that the resin component in the plate will bond to a similar resin on the tube. This approach results in an acceptable bond but produces less efficient heat transfer to the coolant because of the resin layer on the coolant tube.

Still another problem attendant to the prior art coolant plate assemblies relates to the difference in the CTE of the metal tube as compared to the carbon particle component of the assembly. The dilemma facing the stack designer involves the need to minimize thermal stress when a graphite-binder/metal composite component contacts a graphite-binder component. The CTE of the metal component is different from the CTE of the graphite-binder components so the designer is faced with the problem of how to tailor the graphite-binder portion of the coolant plate to so as to minimize thermal stress between the various components of the stack.

DISCLOSURE OF THE INVENTION

This invention relates to the formation of a coolant plate complex which includes a serpentine metal coolant flow tube embedded in a graphite particle-binder plate. The graphite particles used in the plate are graphite flakes. Flake graphites are differentiated from synthetic graphites in several ways. Flake graphites are flake-like in particle shape, as opposed to more spheroidal shapes or needle-like shapes found within the synthetic graphite family. The flake-like shape results in molded articles with significantly higher densities, and therefore lower porosities, versus synthetic grades. This is due to the stacking effect achieved with flake materials under the influence of molding pressures. This has the effect of reducing the resin demand, that is to say, reducing the quantity of resin required to "glue" the structure together. This effect has several advantages.

1. Polymers have high CTE's (Coefficients of Thermal Expansion). Low CTE's are desirable in (PAFC) phosphoric acid fuel cell designs. Therefore, flake graphites enable the formulation of molded components with CTE's as low as 1 ppm/deg. F.

2. Engineering polymers typically cost at least 5–10 times more than the graphite flakes. Reducing resin demand lowers the material cost.

3. Polymers are inherently non-conductors. High conductivity components are advantageous in PAFC designs. Flake graphites, by reducing polymer demand, improve the range of thermal and electrical conductivities obtainable with graphite/polymer systems.

4. Low porosity plates are a desirable aspect of the molded cooler concept from the standpoint of minimizing the Electrolyte Take-Up (ETU) of the component. Flake graphites offer lower porosity structures with low ETU.

5. Flake structures, with flakes stacked on top of each other, possess an ability to resist compressive loads. In such a structure, with fluorocarbon thermoplastic resin as binder, resin creep at operating temperatures is of less concern because the compressive resistance is dominated by the flakes, not the resin.

6. It is believed that graphite microstructures that are as close to the theoretical ideal graphite crystalline structure are more stable and possess maximum corrosion resistance. In X-ray diffraction studies of a variety of synthetic and purified natural flake materials, a purified natural graphite flake was identified to have excellent graphite crystal structure.

The coolant plate complex includes a metal, preferably stainless steel, serpentine coolant circulating tube which has its exterior surface roughened so as to obtain improved adhesion between the graphite flake-binder and the coolant tube components of the plate complex. This helps to prevent cracking of the graphite flake-binder plate component during thermal cycles, while at the same time providing excellent heat transfer from the molded cooler material to the coolant tubes. The plate component is also formed with a thermally graded graphite flake-binder mixture so that the plate component possesses different CTE values at its upper and lower surfaces than in its middle portion. The problems found in the prior art resulting from thermal stress are thus ameliorated in the coolant plate complex of this invention.

It is therefore an object of this invention to provide a coolant plate structure for use in a phosphoric acid fuel cell stack.

It is a further object of this invention to provide coolant plate structure of the character described which is essentially non-porous and hydrophobic.

It is another object of this invention to provide a coolant plate structure of the character described which is not functionally impaired by thermal expansion and contraction of stack components.

It is an additional object of this invention to provide a coolant plate structure of the character described which resists degradation and maintains optimum operating characteristics during extended stack operation.

It is yet another object of this invention to provide a coolant plate structure of the character described which provides for improved adhesion between the coolant tube component and the graphite-binder plate component of the structure.

These and other objects and advantages of the invention will become more readily apparent from the following detailed description of a preferred embodiment of the invention when taken in conjunction with the accompanying drawings in which:

BEST MODE FOR CARRYING OUT THE INVENTION

Figure 1:
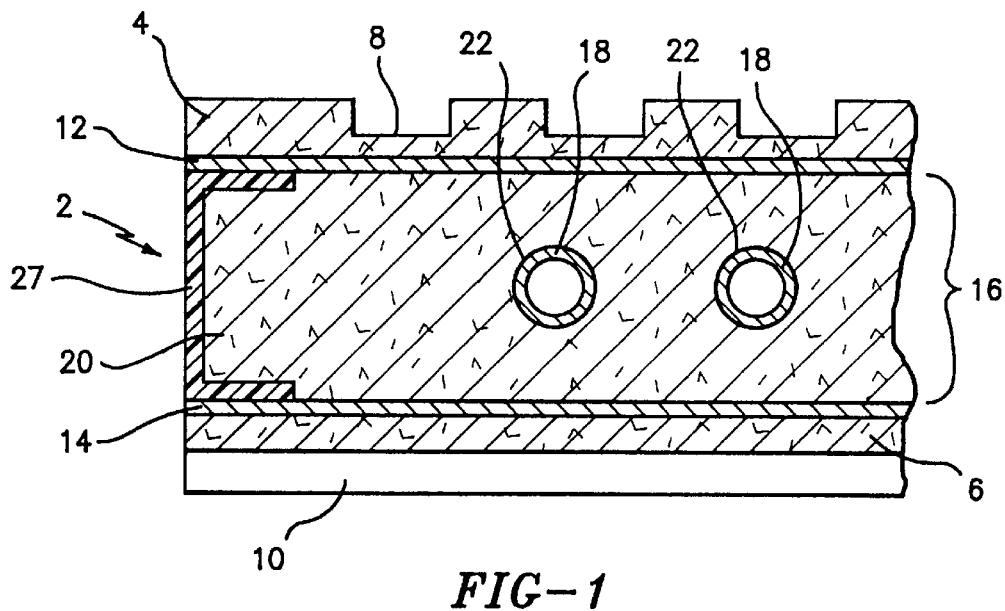
FIG. 1 is a fragmented sectional view of a phosphoric acid fuel cell stack subcomponent which includes two reactant flow fields, two separator plates, and a coolant plate structure formed in accordance with this invention.

Referring now to the drawings, there is shown in FIG. 1 a portion of a flow field/separator plate/coolant plate subassembly adapted for use in a phosphoric acid fuel cell stack. The sub-assembly is denoted generally by the numeral 2 and includes a first electrode flow field plate 4 for one cell in the stack, and a second electrode flow field plate 6 for an adjacent cell in the stack. The plates 4 and 6 include grooves 8 and 10 respectively through which the reactants flow. First and second electrically conductive carbon separator plates 12 and 14 are disposed adjacent to the sides of each flow field plate 4 and 6 respectively which are distal of the grooves 8 and 10. The coolant plate assembly 16 includes a serpentine metal coolant flow passage tube 18 which is embedded in a holder plate 20 formed from graphite flakes bonded together by a hydrophobic resin such as Fluorinated ethylene propylene polymer (FEP). The exterior surface 22 of the coolant tube 18 is roughened so as to provide improved adhesion to the graphite flake-binder plate. The surface roughening may be supplied by flame spraying, sand blasting, or the like. The improved adhesion helps prevent cracking of the plate 20 during thermal cycling, and improves adhesion with the holder plate. Heat transfer is improved in the absence of the separate resin layer on the tube 18. The edges of the holder plate 20 are protected against acid penetration by means of a corrosion-resistant acid-impermeable layer 27. The layer 27 can be formed from a tape of fluorethylene polymer, or polytetrafluoroethylene which has an adhesive layer which provides adhesion of the tape to the plate 20. Alternatively, the layer 27 can comprise a corrosion-resistant material such as a fluorel elastomer which is coated onto the plate 20 and bonded in situ during initial stack heat-up. In either case, the plate 20 will be protected from acid penetration during stack operation.

Figure 2:
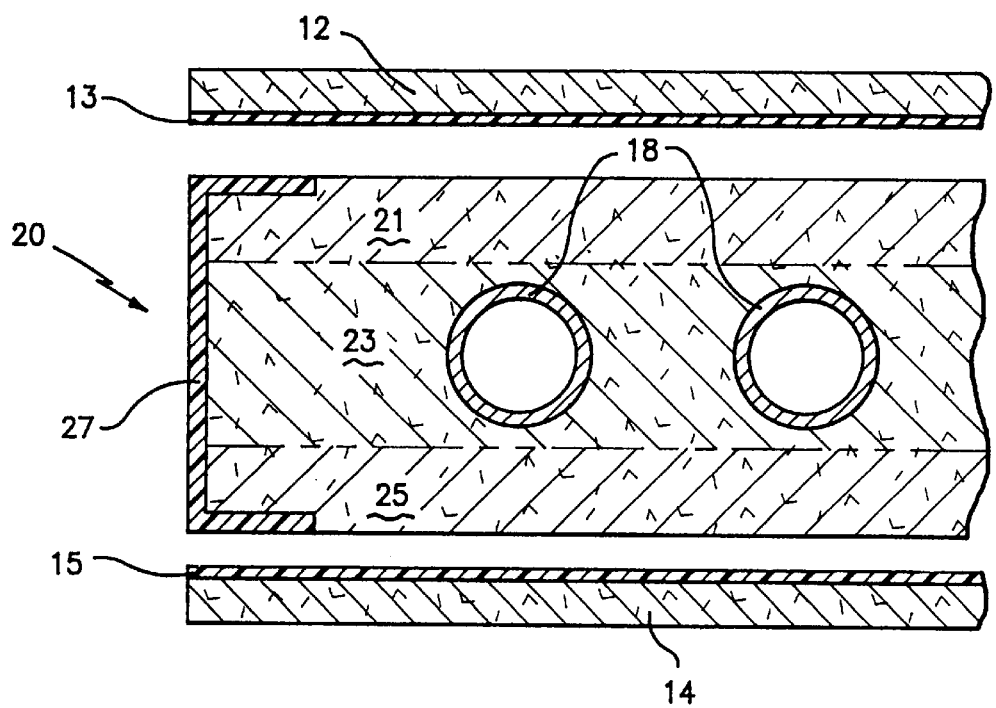
FIG. 2 is a fragmented exploded view of the coolant plate structure and separator plate subassembly of FIG. 1 showing the graded formation of the coolant plate structure.

FIG. 2 illustrates the graded nature of the holder plate 20. The plate 20 is divided into three internal zones 21, 23 and 25 as seen in the through-plane direction. The separator plate 12 is bonded to the zone 21 by a fluoropolymer resin layer 13; and the separator plate 14 is bonded to the zone 25 by a fluoropolymer resin layer 15. The coolant tube 18 is contained in the zone 23. The zones 21 and 25 are made from a graphite flake-binder formulation which imparts a lower CTE to the zones 21 and 25; and the zone 23 is made from a graphite flake-binder formulation which imparts a higher CTE to the zone 23. The lower CTE zones 21 and 25 are more compatible with the CTE of the separator plates 12 and 14; and the higher CTE of the zone 23 is more compatible with the CTE of the steel coolant tube 18. The zones 21 and 25 may, for example, be formed from a mixture which imparts a CTE of 2–3 ppm/degree F.; and the zone 23 may be formed from a mixture which imparts a CTE of 4–6 ppm/degree F. An exemplary mixture for obtaining the 2–3 ppm/degree F. consists of about 11% by weight of Dupont Teflon brand FEP polymer powder product #TE9050; and about 89% by weight of flake graphite Grade SGC 2901, a product of Superior Graphite Company of Chicago, Ill. An exemplary mixture for obtaining the 4–6 ppm/degree F. consists of about 11% by weight of a FEP polymer powder, ICI Advanced Ceramics (Exton, Pa.) product #TL-120; and 89% Superior Graphite Company Grade E-498 flake graphite. It will be understood that the desired CTE values can be obtained by varying either or both of the graphite and binder constituents.

It will be readily appreciated that the coolant plate assembly of this invention will provide improved thermal cycling stability and will provide improved heat transfer and improved cooling capacity. The use of the flake graphite constituent in the coolant tube holder plate results in a component that has longer operating life. Other thermoplastic polymers such as polyphenylene sulfide, and thermosetting polymers such as phenolic can be used to form the molded cooler.

Since many changes and variations of the disclosed embodiment of the invention may be made without departing from the inventive concept, it is not intended to limit the invention otherwise than as required by the appended claims.

What is claimed is:

1. A cooler assembly for use in a fuel cell stack, said cooler assembly comprising:
    a) a tubular conduit for containing a flowing stream of a coolant fluid; and
    b) a plate formed from a flake graphite-polymer binder mixture, said mixture including a major percentage of flake graphite and a minor percentage of polymer binder, said plate surrounding said tubular conduit.

2. The cooler assembly of claim 1 wherein said flake graphite-polymer mixture is bonded to said tubular conduit.

3. The cooler assembly of claim 2 wherein said tubular conduit is a metal tube having a roughened exterior surface operable to provide an enhanced bond between the flake graphite-polymer mixture and the tube.

4. The cooler assembly of claim 3 wherein said metal tube is serpentine in configuration.

5. The cooler assembly of claim 1 wherein said flake graphite-polymer binder mixture is formulated so as to provide spaced-apart surface zones on said plate which surface zones have a coefficient of thermal expansion which is compatible with a coefficient of thermal expansion of carbon components of the stack that contact said surface zones of the cooler assembly; and said flake graphite-polymer binder mixture also being formulated so as to provide an internal zone in said plate which has a higher coefficient of thermal expansion than said surface zones, and which is compatible with the coefficient of thermal expansion of said tubular conduit so as to minimize thermally-induced stress between adjacent internal stack components during thermal cycling of the stack.

6. The cooler assembly of claim 1 further comprising a corrosion-resistant, acid-impermeable material layer forming side edges of said plate, said material layer being operable to protect said plate against acid penetration.

7. A cooler assembly for use in a fuel cell stack, said cooler assembly comprising a tubular conduit for containing a flowing stream of a coolant fluid, said tubular conduit having a roughened outer surface; and a plate formed from a flake graphite-polymer binder mixture, said mixture including a major percentage of flake graphite and a minor percentage of polymer binder, said plate being molded about said tubular conduit, and said plate being intimately bonded to said tubular conduit by reason of the roughened outer surface of said conduit.

8. The cooler assembly of claim 7 wherein said tubular conduit is formed from metal, and wherein said flake graphite-polymer binder mixture is formulated so as to provide spaced-apart surface zones in said plate which surface zones have a coefficient of thermal expansion, which is compatible with a coefficient of thermal expansion of carbon components of the stack that contact said surface zones of the cooler assembly; and said flake graphite-polymer binder mixture also being formulated so as to provide an internal zone in said plate in which said tubular conduit is disposed, said internal zone having a higher coefficient of thermal expansion than said surface zones, and which is compatible with the coefficient of thermal expansion of said tubular conduits so as to minimize thermally-induced stresses between adjacent internal stack components during thermal cycling of the stack.

9. The cooler assembly of claim 7 further comprising a corrosion-resistant, acid-impermeable material layer forming side edges of said plate, said material layer being operable to protect said plate against acid penetration.

10. A cooler assembly for use in a fuel cell stack, said cooler assembly comprising a plate formed from a graphite-polymer binder mixture, said mixture being molded into a plate, and formulated so as to provide spaced-apart surface zones in said plate which surface zones have a coefficient of thermal expansion which is compatible with a coefficient of thermal expansion of carbon components of the stack that contact said surface zones of the cooler assembly, and said graphite-polymer binder mixture also being formulated so as to provide an internal zone in said plate, said internal zone having a higher coefficient of thermal expansion than said surface zones; and a metal tubular conduit for containing a flowing coolant fluid stream, said tubular conduit having a coefficient of thermal expansion which is compatible with the coefficient of thermal expansion of said internal zone in said plate, said plate being formulated to minimize thermally-induced stresses between adjacent internal stack components during thermal cycling of the stack.

11. The cooler assembly of claim 10 wherein the graphite component of said mixture is flake graphite.

12. The cooler assembly of claim 10 further comprising a corrosion-resistant, acid-impermeable material layer forming side edges of said plate, said material layer being operable to protect said plate against acid penetration.

* * * * *

UNITED STATES PATENT AND TRADEMARK OFFICE
CERTIFICATE OF CORRECTION

PATENT NO. : 6,050,331
DATED : April 18, 2000
INVENTOR(S) : Richard D. Breault, Ronald G. Martin, Robert P. Roche, Glen W. Scheffler, Joseph J. O'Brien, and Michael J. Rajpolt, Jr.

It is certified that error appears in the above-identified patent and that said Letters Patent is hereby corrected as shown below:

Section [75], "Inventors" of the Title page after "Joseph J. O'Brien", please insert -- Michael J. Rajpolt, Jr., Marlborough, Conn. --.

<u>Column 1</u>,
In the specification, before "TECHNICAL FIELD", please insert -- The United States Government has a paid up license in this invention and the right in limited circumstances to require the patent owner to license others on reasonable terms as provided by the terms of contract No. DE-AC21-88MC24221 awarded by the Department of Energy. --.

Signed and Sealed this

Twenty-first Day of August, 2001

Attest:

*Nicholas P. Godici*

NICHOLAS P. GODICI
*Acting Director of the United States Patent and Trademark Office*

*Attesting Officer*